United States Patent [19]

Hamatsu et al.

[11] Patent Number: 5,048,052
[45] Date of Patent: Sep. 10, 1991

[54] SPREAD SPECTRUM COMMUNICATION DEVICE

[75] Inventors: Masahiro Hamatsu; Shoichi Minagawa; Masaharu Mori, all of Tokyo, Japan

[73] Assignee: Clarion Co., Ltd., Tokyo, Japan

[21] Appl. No.: 475,185

[22] Filed: Feb. 2, 1990

[30] Foreign Application Priority Data

Feb. 7, 1989 [JP] Japan .................................. 1-29538

[51] Int. Cl.⁵ ............................................. H04L 27/30
[52] U.S. Cl. .......................................... 375/1; 380/46; 380/47
[58] Field of Search ................... 375/1, 111, 114–120; 380/48, 46, 47

[56] References Cited

U.S. PATENT DOCUMENTS 4,119,926 10/1978 Frosch et al. .................. 375/1 X
4,280,222 7/1981 Flower ............................. 375/1 X
4,607,375 8/1986 Lee ................................... 375/1 X
4,926,440 5/1990 Mikoshiba et al. ................ 375/1

FOREIGN PATENT DOCUMENTS 0190143 11/1983 Japan
1-188044 7/1989 Japan

Primary Examiner—Bernarr E. Gregory
Attorney, Agent, or Firm—Flynn, Thiel, Boutell & Tanis

[57] ABSTRACT

The present invention is a spread spectrum communications system where the plural pseudonoise codes are switched such that one pseudonoise code represents binary "1" and another pseudonoise code represents binary "0" of the binary data to be transmitted. Further, in the receiver, a reference pseudonoise code is generated which is asynchronous with respect to the carrier and with respect to the pseudonoise codes of the transmitter. The reference pseudonoise code is used in a convolver to reproduce the transmitted information signal.

18 Claims, 11 Drawing Sheets

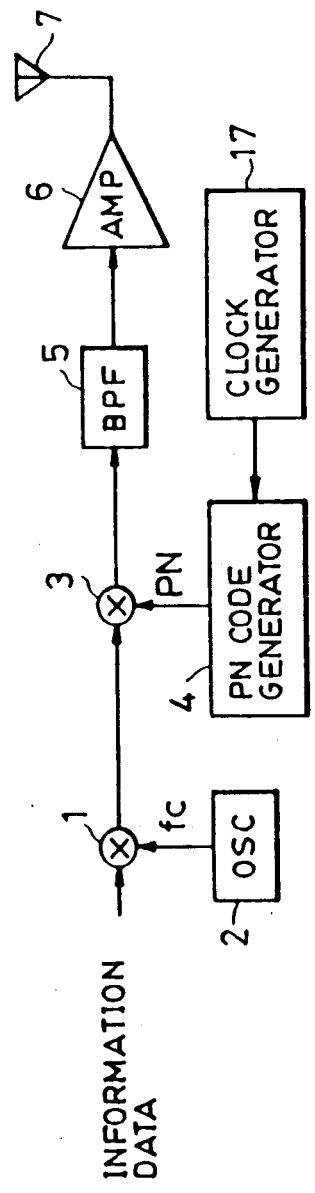
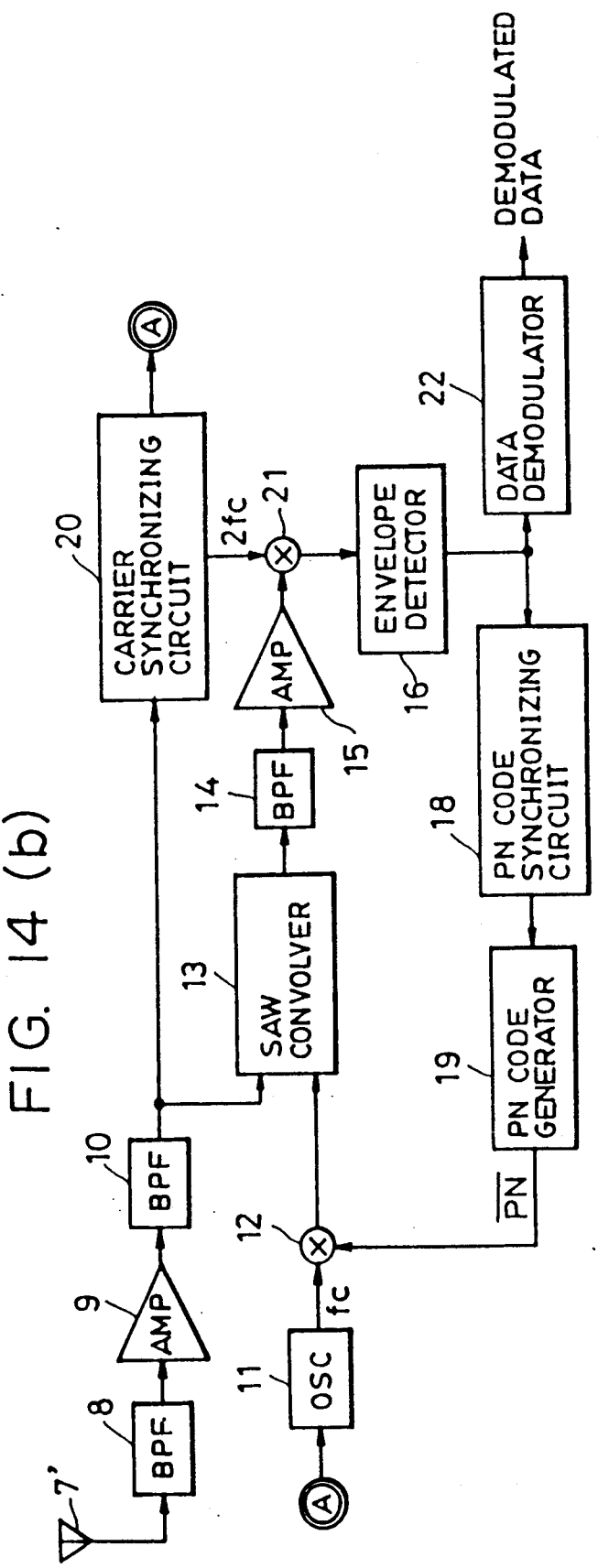
FIG. 14 (a)
FIG. 14 (b)

5,048,052

SPREAD SPECTRUM COMMUNICATION DEVICE

FIELD OF THE INVENTION

The present invention relates to an improvement of a spread spectrum communication (hereinbelow abbreviated to SSC) device, which transmits and receives various sorts of information by using spread spectrum.

BACKGROUND OF THE INVENTION

Heretofore various sorts of communication systems have been investigated and developed. Among them the SSC system is well known.

By this SSC system, on the transmitter side, a signal such as data, sound, etc. having a narrow band is spread in spectrum into a wide band to be transmitted by using a pseudo-noise code (PN code) and, on the receiver side, this wide band signal is spread inversely into the original narrow band by means of a correlator to reproduce the signal. Recently attention is paid to this communication system, because it has always a very high reliability from the point of view that it is strong against external interference and noise, it has a high secrecy, etc.

However the greatest problematical point in the SSC system is the correlator used on the receiver side. At present, for the wireless SSC, a correlator, which is thought to be the most simple and convenient and to have a high reliability, is a device using surface acoustic wave (hereinbelow abbreviated to SAW).

In the SAW correlator there are, in general, those of correlator type (tapped delay line type) and those of convolver type. Here, although those of correlator type has a simple construction and generally a high efficiency, the temperature coefficient of the substrate has remarkable influences thereon. On the other hand, although those of convolver type are hardly influenced by variations in the temperature, they have, in general, a low efficiency. In addition, concerning the PN code described above, the code is fixed for those of correlator type, while it can be freely changed for those of convolver type.

Consequently correlators of convolver type are more easily used, provided that the efficiency is at a practically usable level.

FIGS. 14a and 14b show an example of the construction of the prior art SSC device using an SAW convolver. In the transmitter section indicated in FIG. 14a, a carrier coming from an oscillator 2 is two-phase-modulated by a signal to be transmitted (in this case digital data) in a mixer 1 to effect at first a primary modulation with a narrow band. Thereafter the output of the mixer 1 is further two-phase-modulated e.g. in another mixer 3 by using a PN code (PN) generated by a PN code generator 4 having a band substantially wider than the information signal to be transmitted and a high bit rate to spread the spectrum and then the signal is transmitted through an antenna 7 after having passed through a band pass filter 5 and an amplifier 6.

In the receiver section indicated in FIG. 14b, the spread spectrum signal received by an antenna 7' is applied to an SAW convolver 13 after having been RF amplified by an amplifier 9 and band pass filters 8 and 10.

Further, to the SAW convolver 13 is applied a reference signal obtained by two-phase-modulating a carrier coming from an oscillator generating the same carrier frequency as the received signal inputted by the SAW convolver in a mixer 12 by means of a PN code generator 19 generating a PN code ($\overline{PN}$), which is inverted in time with respect to the PN code on the transmitter side.

The PN code for the reference signal described above is sent from the transmitter side by means of a PN code synchronizing circuit 18 to be kept in a synchronized state with the received PN code. At this time, the output of the convolver (the frequency thereof is twice as high as the inputted carrier frequency, i.e. 2fc) is led to an envelope detector 16 after having passed through a mixer 21 through a band pass filter 14 and an amplifier 15 for the PN code synchronization described above, while keeping the synchronism with the carrier of the received signal owing to a synchronizing circuit 20 (the central frequency is 2fc). The information data can be obtained by demodulation by means of a data demodulator 22, when the PN code and the carrier are in the synchronized state.

However, in the construction of the prior art SSC device described above, since it is necessary to synchronize the PN code with the carrier, it is difficult to simplify the construction of the receiver, which causes a problem in practice.

OBJECT OF THE INVENTION

The present invention has been done, taking such a point into account and the object thereof is to provide an SSC device capable of reproducing information without taking any measures to synchronize the PN code and the carrier with each other.

SUMMARY OF THE INVENTION

In order to achieve the above object, an SSC device according to the present invention, consists of a transmitter comprising spread-modulating means including a plurality of pseudo-noise code generators having different code patterns and a gate outputting selectively one output of the pseudo-noise code generators, responding to information data; and a receiver comprising a reference pseudo-noise code generator generating a reference pseudo-noise code, which is asynchronous to the carrier frequency and the pseudo-noise code of the transmitter described above and further inverted in time with respect to the code pattern of either one of the pseudo-noise code generators stated above, a correlator, in which the reference pseudo-noise code stated above and a received spread signal are inputted, waveform shaping means, which shapes waveform of a correlation peak train outputted by the correlator stated above, and a demodulator for reproducing the information data described above, responding to each of pulses of the signal, whose waveform is shaped.

Another SSC device according to the present invention consists of a transmitter comprising spread-modulating means including a plurality of pseudo-noise code generators having different code patterns and a gate outputting selectively one output of the pseudo-noise code generators, responding to information data; and a receiver comprising a plurality of reference pseudo-noise code generators, each of which generates a reference pseudo-noise code, which is asynchronous to the carrier frequency and the pseudo-noise code of the transmitter described above and further inverted in time with respect to the code pattern of each of the pseudo-noise code generators stated above, a plurality of correlators, in each of which the reference pseudo-noise code stated above and a received spread signal are inputted, a plurality of waveform shaping means, each of which shapes waveform of a correlation peak train outputted by each of the correlators stated above, and comparing demodulating means for reproducing the information data described above, comparing the signals outputted by the plurality of waveform shaping means described above.

Still another SSC device according to the present invention consists of a transmitter comprising spread-modulating means including a plurality of pseudo-noise code generators having different code patterns and a gate outputting selectively one output of the pseudo-noise code generators, responding to information data; and a receiver comprising a plurality of reference pseudo-noise code generators, each of which generates a reference pseudo-noise code, which is asynchronous to the carrier frequency and the pseudo-noise code of the transmitter described above and further inverted in time with respect to the code pattern of each of the pseudo-noise code generators stated above, a correlator, in which the reference pseudo-noise code stated above and a received spread signal are inputted, waveform shaping means, each of which shapes waveform of a correlation peak train outputted by the correlator stated above, control means for switching over selectively the outputs of the plurality of pseudo-noise codes described above, responding to the signal, whose waveform is shaped, and comparing demodulating means for reproducing said information data, comparing the signals outputted by said plurality of waveform shaping means.

In the receiver described above, the demodulating process by the carrier and the PN code is effected asynchronously and for this reason the repetition speed of the PN code is sufficiently high than the speed of the information to be transmitted.

BRIEF DESCRIPTION OF THE DRAWINGS

FIGS. 14a and 14b are block diagrams showing the construction of a prior art SSC device using an SAW convolver.

DETAILED DESCRIPTION

Figure 1:
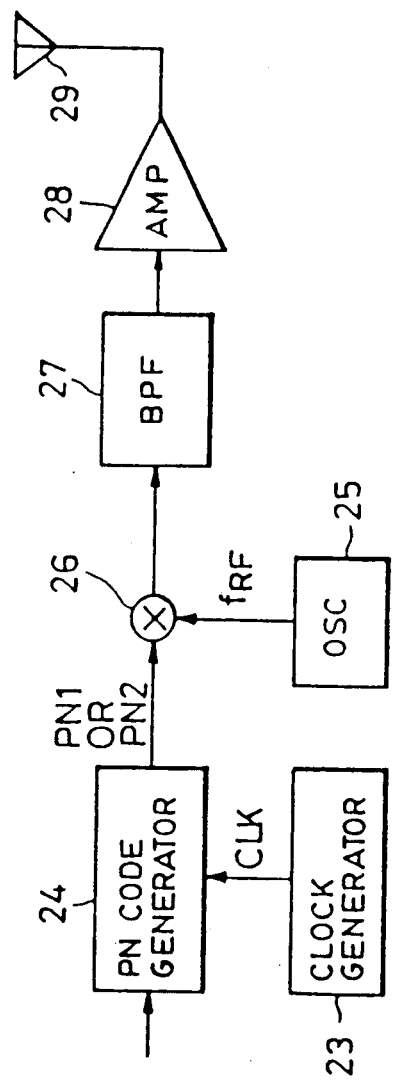
FIG. 1 is a block diagram showing the construction of an SSC transmitter according to the present invention.
Figure 3:
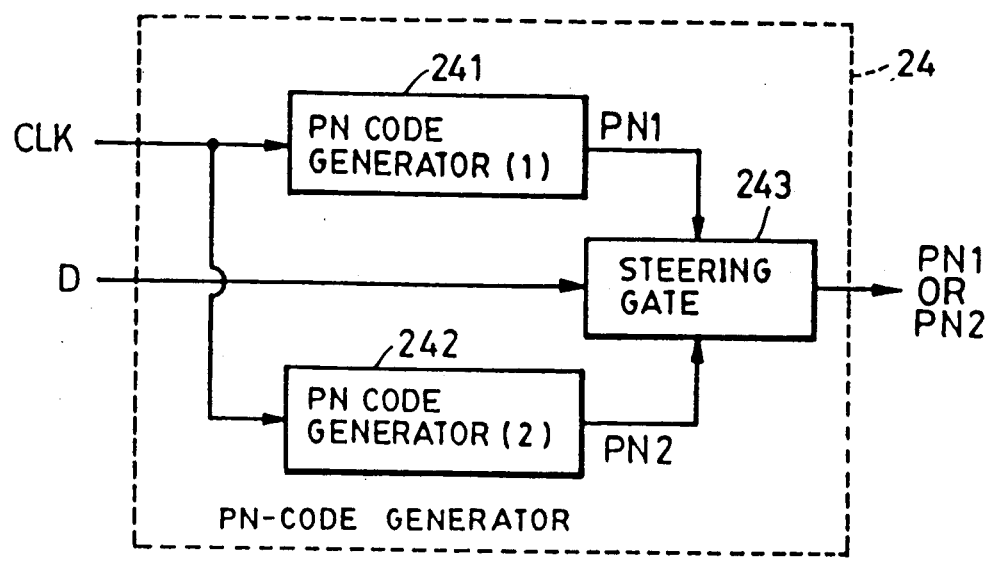
FIG. 3 is a block diagram showing an example of the construction of a PN code generator indicated in FIG. 1.
Figure 4:
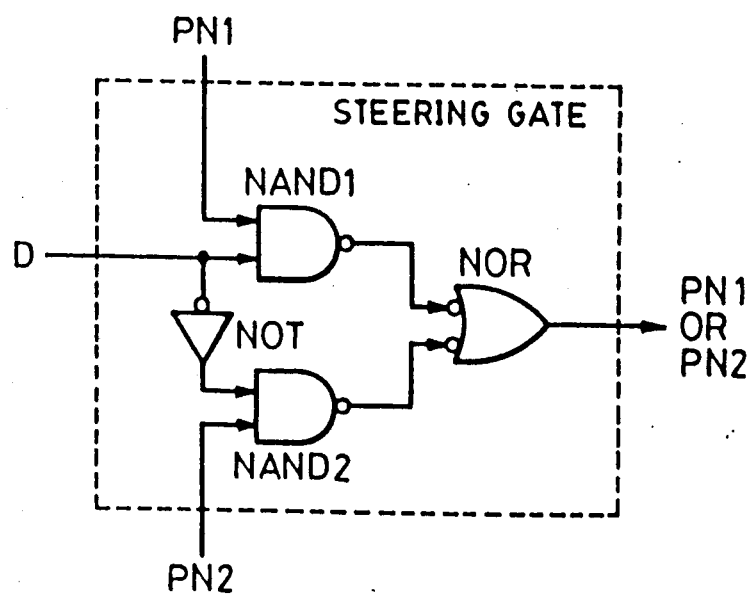
FIG. 4 is a block diagram showing an example of the construction of a steering gate indicated in FIG. 3.

FIG. 1 is a block diagram showing the construction of an SSC transmitter according to the present invention, in which reference numeral 23 is a clock generator; 24 is a PN code generator; 25 is an oscillator; 26 is a mixer; 27 is a band pass filter; 28 is an amplifier; and 29 is a transmitting antenna. The PN code generator 24 consists of e.g. a first and second PN code generator 241, 242 as well as a steering gate 243, as indicated in FIG. 3. The steering gate 243 consists of NAND circuits NAND1 and NAND2, a NOT circuit NOT and a NOR circuit NOR, as indicated in FIG. 4.

Figure 5:
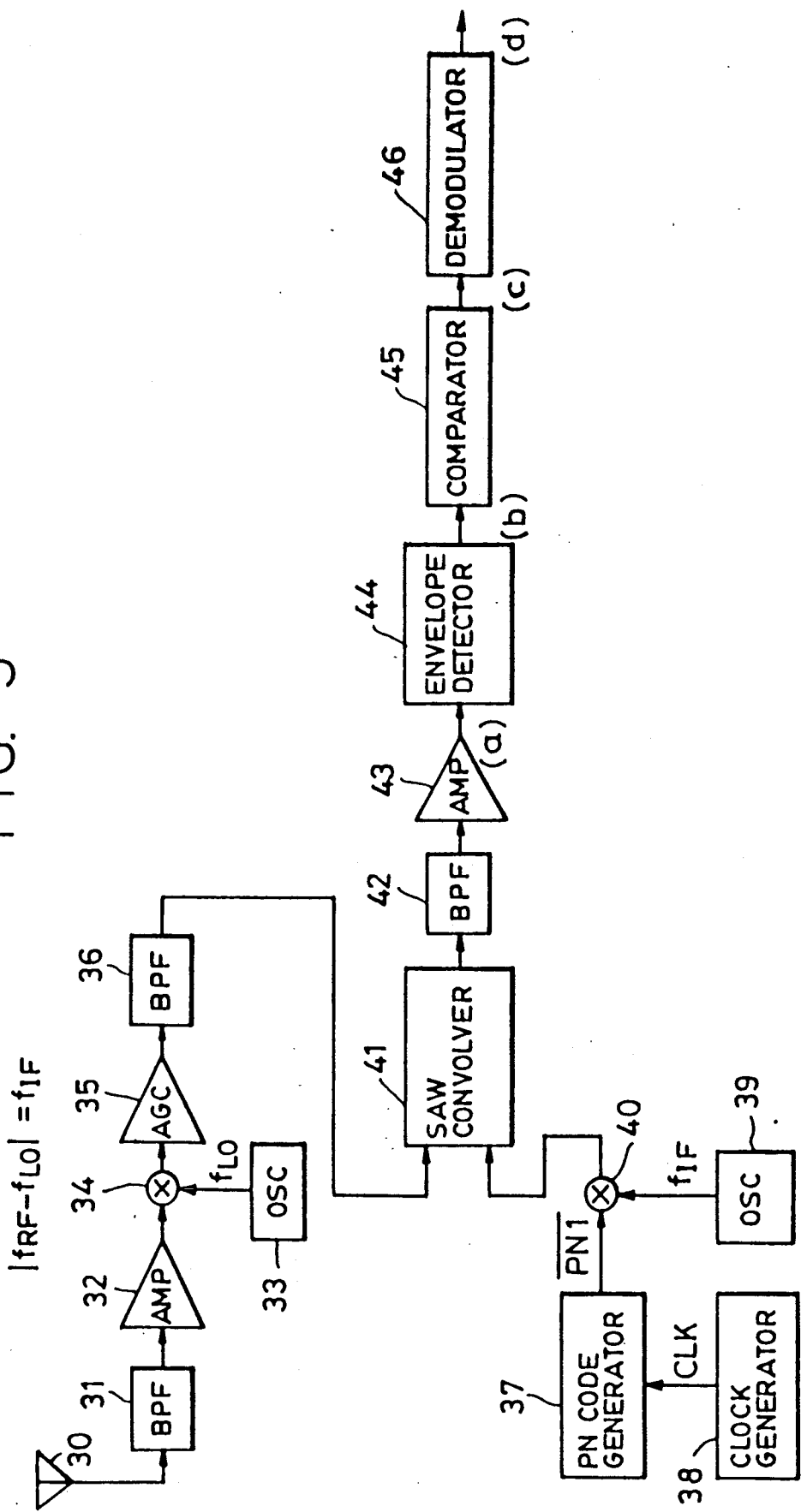
FIG. 5 is a block diagram showing the construction of a receiver according to the present invention.

FIG. 5 is a block diagram showing the construction of a receiver according to the present invention, in which reference numeral 30 is a receiving antenna; 31 is a band pass filter; 32 is an amplifier; 33 is an oscillator; 34 is a mixer; 35 is an AGC amplifier; 36 is a band pass filter; 37 is a PN code generator; 38 is a clock generator; 39 is an oscillator; 40 is an mixer; 41 is an SAW convolver; 42 is a band pass filter; 43 is an amplifier; 44 is an envelope detector; 45 is a comparator; and 46 is a demodulator.

Hereinbelow the operation of the embodiment described above will be explained.

Figure 2:
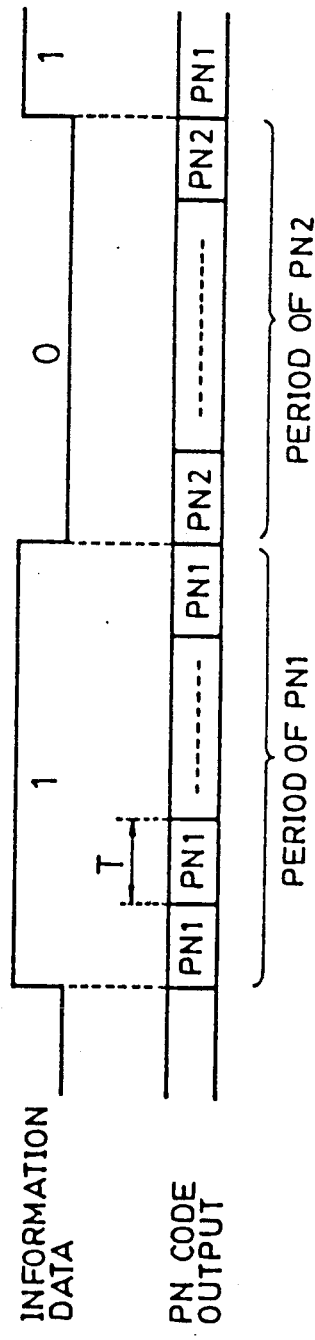
FIG. 2 is a scheme for explaining the CSK-modulation by information data.

FIG. 2 is a scheme for explaining the CSK (Code Shift Keying) modulation using information data, in which PN1 and PN2 represent PN codes having different code patterns and T indicates a period of the PN codes.

In FIG. 1, at first, a PN code is CSK-modulated in the PN code generator 24, using information data. For example, as indicated in FIG. 4, the PN code generator 24 is so constructed that, when the information D represent "1", the steering gate 243 outputs the code PN1 coming from the first PN code generator 241 and on the contrary, when the information data D represent "0", the steering gate 243 outputs the code PN2 coming from the second PN code generator 242.

Next an RF carrier signal (frequency $f_{RF}$) outputted by the oscillator 25 is BPSK-modulated in the mixer 26, by using the output PN1 or PN2 of the PN code generator 24 and it is transmitted through the antenna 29 after having passed through the band pass filter 27 and the amplifier 28.

Further, for the PN codes PN1 and PN2, codes having small mutual correlations such as e.g. preferred pairs of m sequence codes.

Now the operation of the receiver will be explained, by using three examples of the construction.

In EXAMPLE OF CONSTRUCTION 1 indicated in FIG. 5, a spread spectrum signal received by the antenna 30 is multiplied in the mixer 34 by a local carrier signal (frequency $f_{LO}$) outputted by the local oscillator 33 after having passed through the band pass filter 31 and the amplifier 32 to be converted into an intermediate frequency signal, whose central frequency is $f_{IF}$. Usually $f_{IF}$ is chosen so as to be the central frequency of the band for the SAW convolver. Then it is inputted in one of the input ports of the SAW convolver after having passed through the AGC amplifier 35 and the band pass filter 36.

A signal obtained by BPSK-modulating an IF carrier signal (frequency $f_{IF}$) outputted by the oscillator 39, based on the output of the PN code generator 37 generating a PN code, which is inverted in time with respect to the PN code on the transmitter side, in the mixer 40 is inputted in the other input port of the SAW convolver 41 as the reference signal.

The PN code outputted by the PN code generator 37 is either one of the time inverted code $\overline{PN1}$ of PN1 and the time inverted code $\overline{PN2}$ of PN2. However, explanation will be made here, supposing that $\overline{PN1}$ is outputted.

Further the PN code generator 37 and the oscillator 39 are operated completely asynchronously with the PN code and the carrier on the transmitter side.

A correlation peak train is outputted by the SAW convolver 41, only when PN1 between the PN codes (PN1 and PN2) in the received signal is in accordance with PN code ($\overline{PN1}$) in the reference signal on the convolver. Consequently the presence and the absence of the correlation peak train correspond to "1" and "0", respectively, in the information data. The occurrence period of the correlation peak is equal to T/2, T being a period of the PN code.

Figure 6:
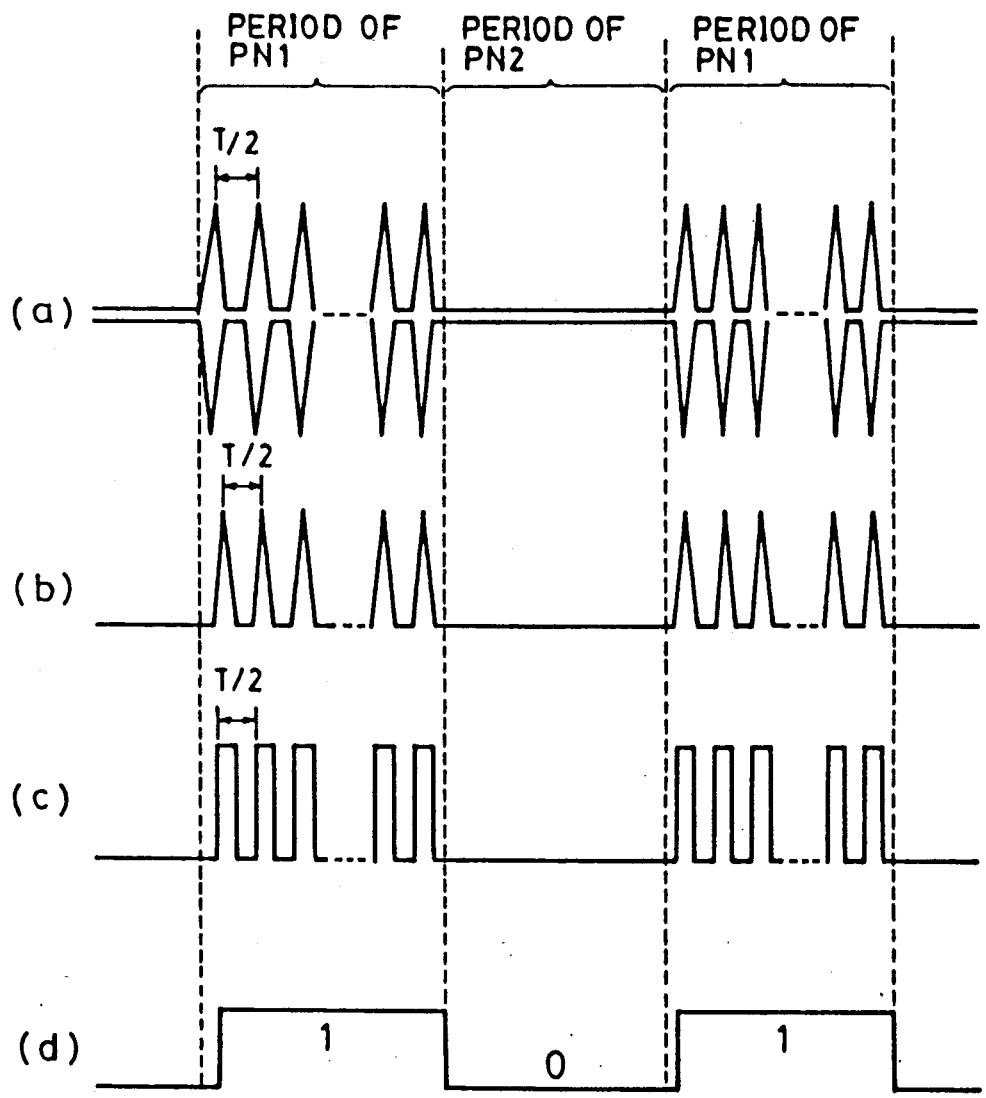
FIG. 6 shows waveforms in various parts in the device indicated in FIG. 5.

The correlation peak is envelope-detected by the envelope detector 44 and converted into demodulated data by the demodulator 46 such as a pulse width enlarging circuit, etc. as described e.g. in JP-A-1-188044, entitled "Spread Spectrum Communication Device" after having been shaped in waveform by the comparator 45. (JP-A-1-188044 corresponds to U.S. Pat. No. 4,926,440.) FIG. 6 shows waveforms in the various parts thereof.

Figure 7:
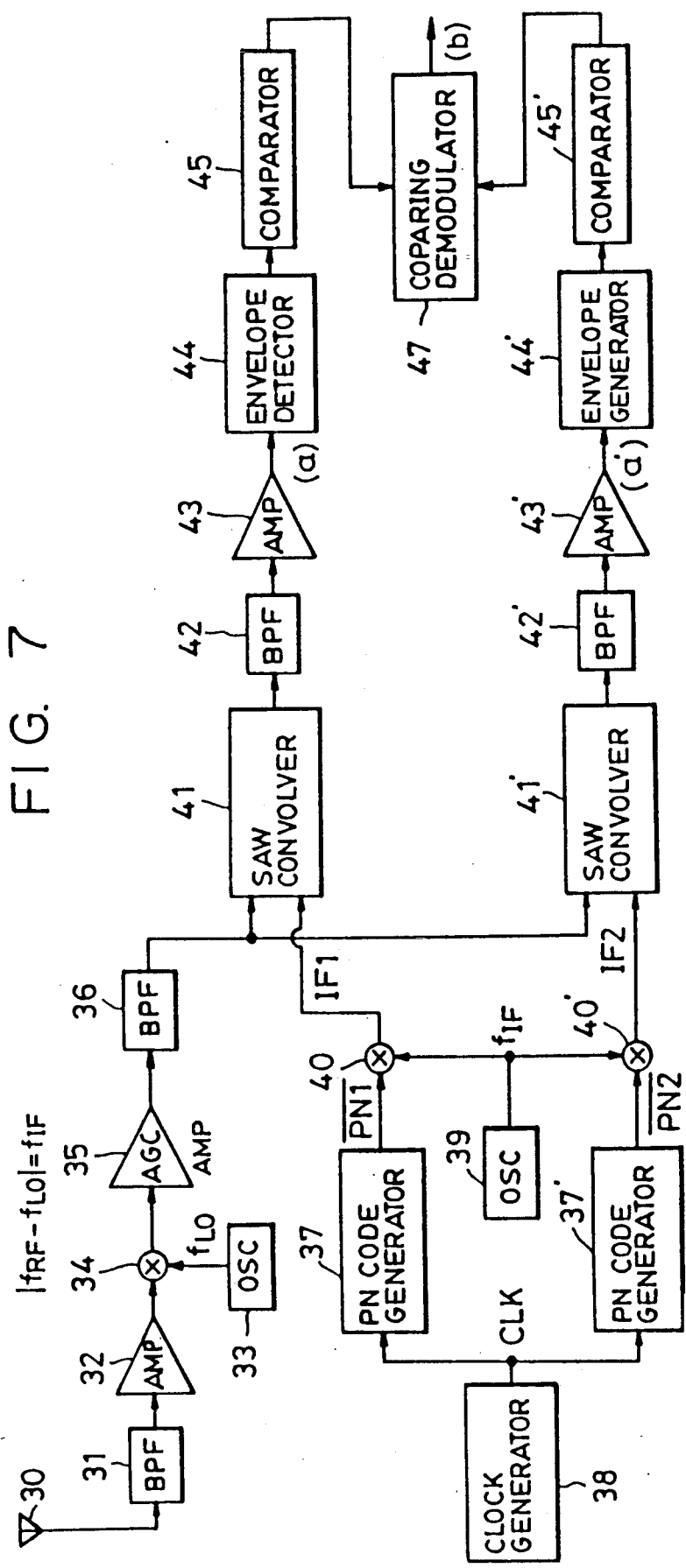
FIG. 7 is a block diagram showing another example of the construction of the receiver.

FIG. 7 shows CONSTRUCTION EXAMPLE 2 of the receiver. This construction example is a receiving method characterized in that the data demodulating property is improved by using two SAW convolvers.

In CONSTRUCTION EXAMPLE 1 indicated in FIG. 5, only one SAW convolver 41 was used so that the correlation peak train was generated only in a period, where the PN code of the transmitter was either one of PN1 and PN2.

On the contrary, in CONSTRUCTION EXAMPLE 2 indicated in FIG. 7, two SAW convolvers 41 and 41' are used and IF carrier signals IF1 and IF2 BPSK-modulated by using the PN codes $\overline{PN1}$ and $\overline{PN2}$, respectively, are inputted as reference signals for the convolvers. In this way, since the correlation peak train is outputted by the convolver 41, when the PN code of the transmitter is in the period of PN1, and the convolver 41', when it is in the period of PN2, the demodulated data can be obtained by means of the comparing demodulator 47 with a reliability about twice as high as that obtained in CONSTRUCTION EXAMPLE 1.

Figure 8:
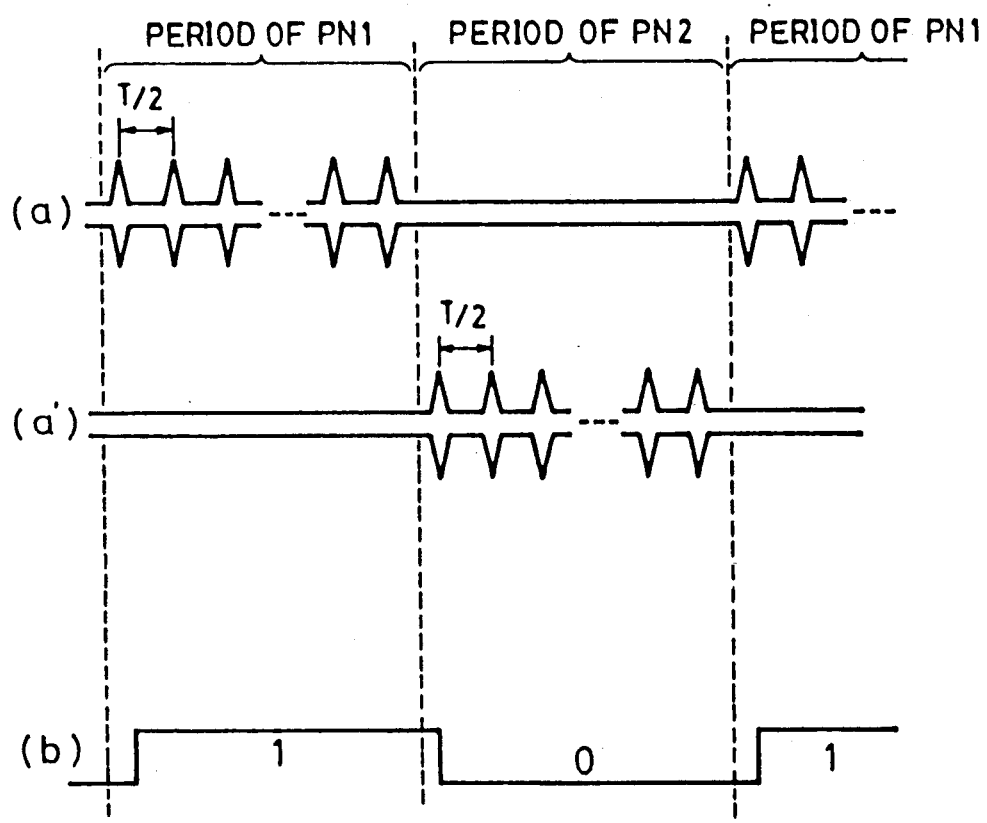
FIG. 8 shows waveforms in various parts in the device indicated in FIG. 7.

FIG. 8 shows waveforms in various parts thereof.

Figure 9:
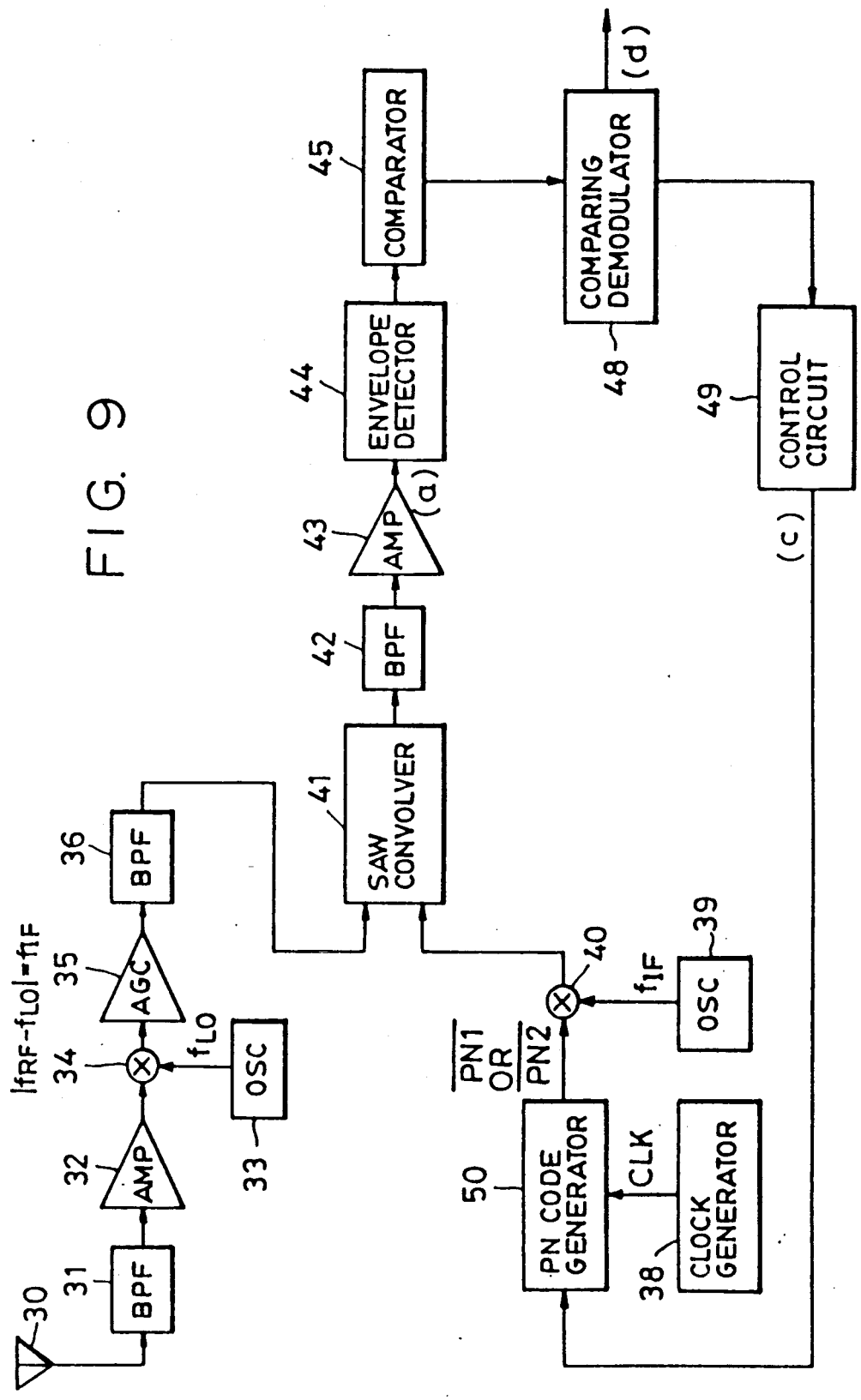
FIG. 9 is a block diagram showing still another example of the construction of the receiver.

FIG. 9 indicates CONSTRUCTION EXAMPLE 3 of the receiver. This construction example is a receiving method characterized in that the data demodulating property is improved by switching over appropriately the output code coming from a PN code generator 50 for the reference signal.

In CONSTRUCTION EXAMPLE 2 indicated in FIG. 7, both the period of PN1 and the period of PN2 of the PN code in the received signal were detected by using the two convolvers.

On the contrary, in CONSTRUCTION EXAMPLE 3 indicated in FIG. 9, there is only one SAW convolver 41 and the demodulated data d is obtained by varying the PN code in the reference signal between $\overline{PN1}$ and $\overline{PN2}$ and judging by means of the comparing demodulator 48 in which case the correlation peak train should be outputted.

A control circuit 49 is a circuit outputting control data c for switching over the PN code outputted by the PN code generator 50 to PN1 or PN2, which are outputted with such a timing that the output of the control data comparing demodulator 48 is stably at maximum.

As the result, in CONSTRUCTION EXAMPLE 3, the demodulator data can be obtained with a reliability about twice as high as that obtained in CONSTRUCTION EXAMPLE 1.

Figure 10:
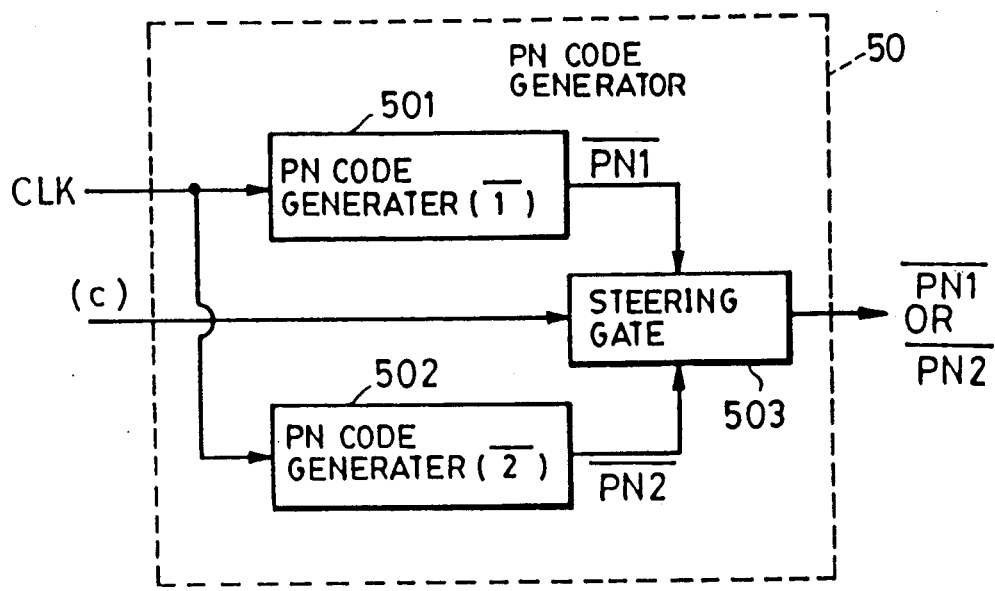
FIG. 10 is a block diagram showing an example of the construction of a PN code generator indicated in FIG. 9.
Figure 11:
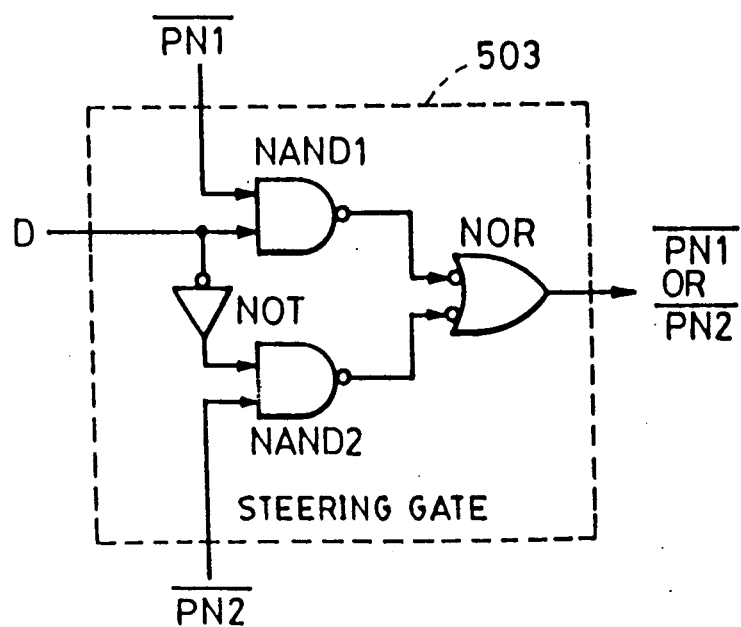
FIG. 11 is a block diagram showing an example of the construction of a steering gate indicated in FIG. 10.

FIG. 10 indicates an example of the construction of the PN code generator 50, in which reference numerals 501 and 502 are a first and a second PN code generator generating time inverted PN and $\overline{PN2}$, and 503 is a steering gate. FIG. 11 indicates an example of the construction of the steering gate in FIG. 11, in which NAND1 and NAND2 are NAND circuits; NOT is a NOT circuit; and NOR is a NOR circuit.

Figure 12:
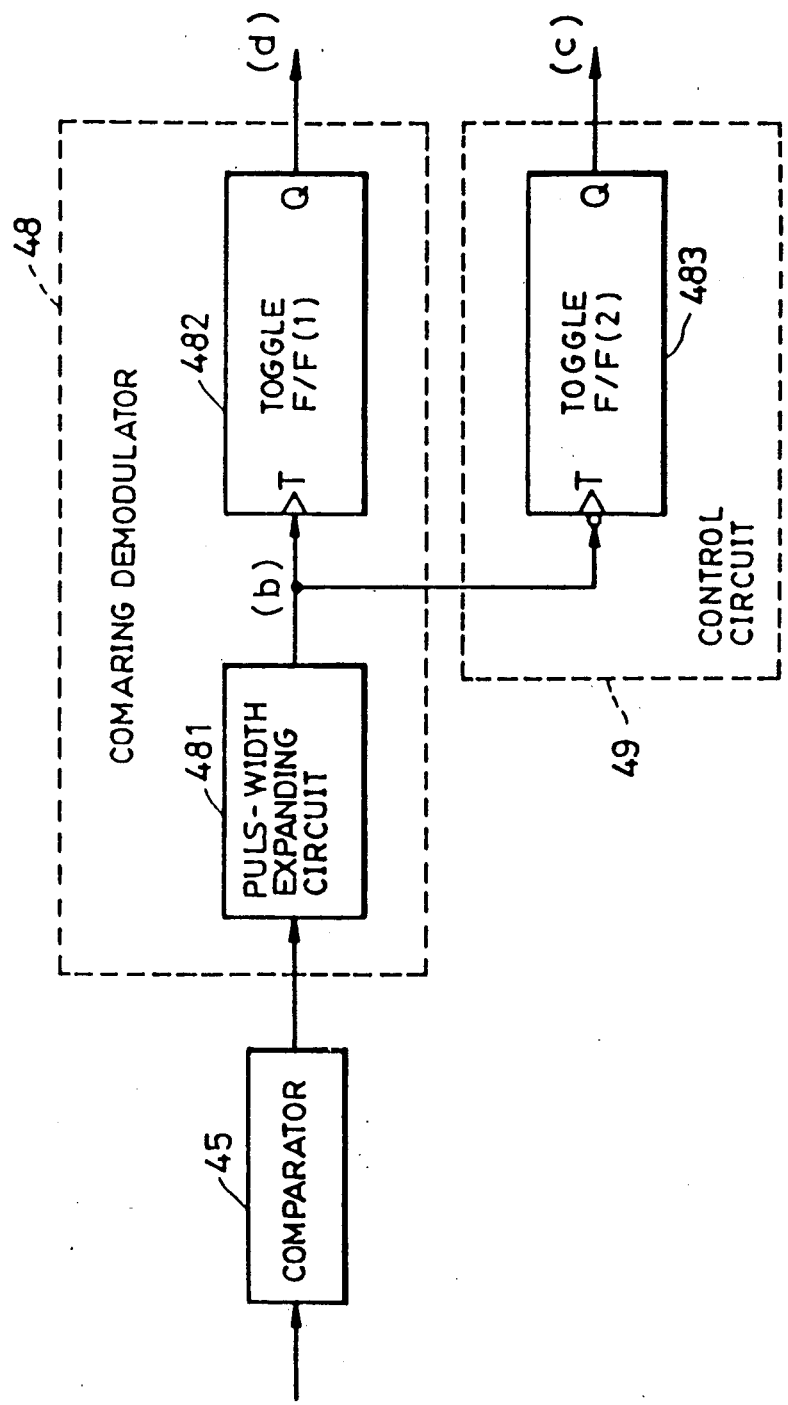
FIG. 12 is a block diagram showing a concrete example of the construction of a comparing demodulator and a control circuit indicated in FIG. 9.
Figure 13:
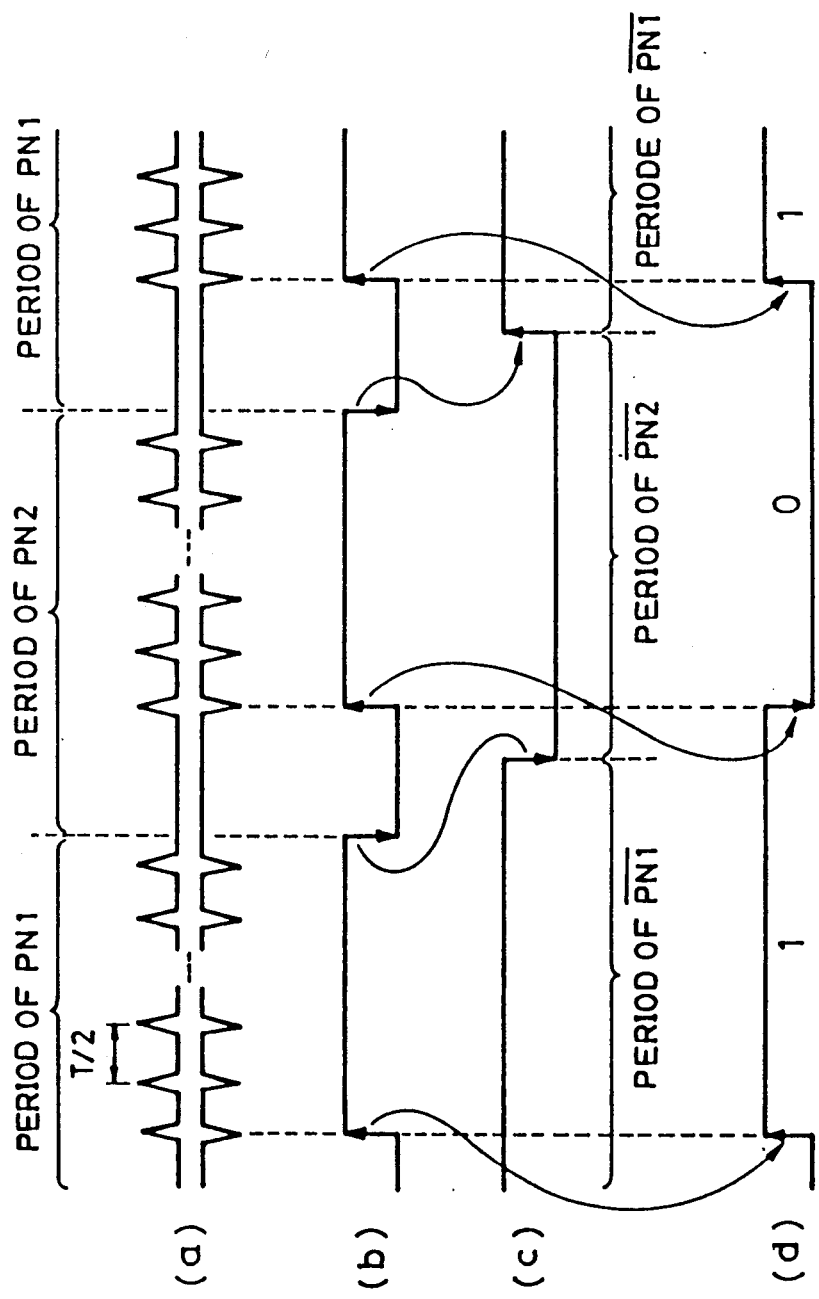
FIG. 13 show waveforms in various parts in the devices indicated in FIGS. 9 and 12.

FIG. 12 shows a concrete example of the construction of the comparing demodulator 48 and the control circuit 49, in which reference numeral 481 is a pulse width enlarging circuit; and 482 and 483 are toggle flipflops F/F. The toggle flipflop F/F 482 is a flipflop circuit, which inverts alternately the output signal level, responding to the rising edge of the input signal (output of the pulse width enlarging circuit 481), which outputs the demodulated data d. The toggle flipflop F/F 483 outputs control data c by means of a flipflop circuit, which inverts alternately the output signal level, responding to the rising edge of the input signal. FIG. 13 shows waveforms in various parts in the circuit indicated in FIGS. 9 and 12, in which (a) indicates the correlation output waveform; (b) demodulated waveform of (a), which is the input in the toggle F/F 481 and 482; (c) the control data, which are the output of the toggle F/F 482; and (d) the demodulated data, which are the output of the toggle F/F 481.

As explained above, according to the present invention, since no synchronizing circuit is used in the SSC device, information communication including few errors can be effected with a high reliability by means of a very simple and convenient transmitter and receiver set. This effect is remarkable, specifically in the case where the communication is effected by using very weak electromagnetic wave, and a significant effect can be obtained in practice.

Further, since the CSK method used for spread-modulating the information data can be easily realized by means of a digital circuit, it is advantageous for fabricating it in the form of an IC and therefore an advantage can be obtained that it is possible to reduce the size of the transmitter and the receiver.

While particular embodiments of the invention have been shown and described, it will be obvious to those skilled in the art that various changes and modifications may be made without departing from the present invention in its broader aspect.

What is claimed is:

1. A spread spectrum communication device comprising:
   a transmitter which includes:
   spread-modulating means including a plurality of pseudo-noise code generators outputting different code patterns and a gate which, in response to information data, selects and outputs one of said code patterns from a respective one of said pseudo-noise code generators, said transmitter transmitting a spread signal which has a carrier frequency and includes said selected code pattern; and a receiver which includes:

a reference pseudo-noise code generator generating a reference pseudo-noise code which is asynchronous to said carrier frequency and said selected code pattern from said transmitter and which is inverted in time with respect to the code pattern of one of said pseudo-noise code generators of said transmitter;

a surface acoustic wave convolver to which is applied said reference pseudo-noise code and the spread signal from said transmitter, a waveform shaper which shapes a waveform of a correlation peak train outputted by said convolver; and demodulator means for reproducing said information data in response to pulses of the shaped waveform from said waveform shaper.

2. A spread spectrum communication device according to claim 1, wherein said pseudo-noise code generators in said transmitter include first and second pseudo-noise code generators, and wherein said gate is a steering gate which, in response to first and second states of said information data, selects and outputs the code patterns respectively outputted by said first and said second pseudo-nose code generators.

3. A spread spectrum communication device according to claim 2 wherein said steering gate includes first and second NAND circuits, a NOT circuit and a NOR circuit.

4. A spread spectrum communication device comprising:

a transmitter which includes:

spread-modulating means including a plurality of pseudo-noise code generators outputting different code patterns and a gate which, in response to information data, selects and outputs one of said code patterns from a respective one of said pseudo-noise code generators, said transmitter transmitting a spread signal which has a carrier frequency and includes said selected code pattern; and a receiver which includes:

a plurality of reference pseudo-noise code generators, each of which generates a reference pseudo-noise code which is asynchronous to said carrier frequency and said selected code pattern from said transmitter and which is inverted in time with respect to the code pattern of a respective one of said pseudo-noise code generators of said transmitter;

a plurality of surface acoustic wave convolvers which each have applied thereto a respective said reference pseudo-noise code and the spread signal from said transmitter;

a plurality of waveform shapers which each shape a waveform of a respective correlation peak train outputted by a respective one of said convolvers; and comparing demodulating means for reproducing said information data by comparing the shaped waveforms from said plurality of waveform shapers.

5. A spread spectrum communication device according to claim 4, wherein said pseudo-noise code generators in said transmitter include first and second pseudo-noise code generators, and wherein said gate is a steering gate which, in response to first and second states of said information data, selects and outputs the code patterns respectively outputted by said first and said second pseudo-noise code generators.

6. A spread spectrum communication device according to claim 5, wherein said steering gate includes first and second NAND circuits, a NOT circuit and a NOR circuit.

7. A spread spectrum communication device comprising:

a transmitter which includes:

spread-modulating means including a plurality of pseudo-noise code generators outputting different code patterns and a gate which, in response to information data, selects and outputs one of said code patterns from a respective one of said pseudo-noise code generators, said transmitter transmitting a spread signal which has a carrier frequency and includes said selected code pattern; and a receiver which includes:

a plurality of reference pseudo-noise code generators each generating a reference pseudo-noise code which is asynchronous to said carrier frequency and said selected code pattern from said transmitter and which is inverted in time with respect to the code pattern of a respective one of said pseudo-noise code generators of said transmitter;

a surface acoustic wave convolver to which is applied a selected one of said reference pseudo-noise codes and the spread signal from said transmitter;

a waveform shaper which shapes a waveform of a correlation peak train outputted by said convolver;

control means for effecting selection of said selected one of said plurality of reference pseudo-noise codes in response to the shaped waveform from said waveform shaper; and comparing demodulating means for reproducing said information data from the shaped waveform.

8. A spread spectrum communication device according to claim 7 wherein said pseudo-noise code generators in said receiver include first and second pseudo-noise code generators and a steering gate which, in response to an output of said control means, selects and outputs one of said reference pseudo-noise codes which is inverted in time with respect to the code pattern in the spread signal and which is outputted by a respective one of said first and said second pseudo-noise code generators.

9. A spread spectrum communication device according to claim 8 wherein said steering gate includes first and second NAND circuits, a NOT circuit and a NOR circuit.

10. A spread spectrum communication device according to claim 7 wherein said comparing demodulating means reproduces and information data by demodulating the shaped waveform from said waveform shaper.

11. A spread spectrum communication device according to claim 7 wherein said comparing demodulating means includes a pulse width enlarging circuit which outputs a signal to a first toggle flipflop.

12. A spread spectrum communication device according to claim 11 wherein said control means includes a second toggle flipflop which receives said signal from said pulse width enlarging circuit.

13. A spread spectrum communication device according to claim 7, wherein said pseudo-noise code generators in said transmitter include first and second pseudo-noise code generators, and wherein said gate is a steering gate which, in response to first and second states of said information data, selects and outputs the code patterns respectively outputted by said first and second pseudo-noise code generators.

14. A spread spectrum communication device according to claim 13, wherein said steering gate includes first and second NAND circuits, a NOT circuit and a NOR circuit.

15. A spread spectrum communication device according to claim 7, wherein said control means includes a toggle flipflop.

16. A spread spectrum communication apparatus, comprising: a transmitter which includes first pseudo-noise code generator means for producing first and second pseudo-noise codes which are different, selecting means for respectively selecting said first and second pseudo-noise codes when an information signal respectively has first and second states, and means for generating a spread signal which is transmitted by said transmitter and which has a carrier frequency and includes the pseudo-noise code selected by said selecting means; and a receiver which includes second pseudo-noise code generator means for generating a third pseudo-noise code which is asynchronous to said carrier frequency and said selected pseudo-noise code and which is the time inverse of a respective one of said first and second pseudo-noise codes, a convolver to which is applied said third pseudo-noise code and the spread signal received from said transmitter, and means responsive to an output of said convolver for reproducing said information signal.

17. A spread spectrum communication apparatus according to claim 16, wherein said second pseudo-noise code generator means generates a fourth pseudo-noise code which is asynchronous to said carrier frequency and said selected pseudo-noise code, said third and fourth pseudo-noise codes respectively being time inverses of said first and second pseudo-noise codes, and including a further convolver to which is applied said fourth pseudo-noise code and the spread signal received from said transmitter, said means for reproducing said information signal being responsive to an output of said further convolver.

18. A spread spectrum communication apparatus according to claim 16, wherein said second pseudo-noise code generator means generates fourth and fifth pseudo-noise codes which are asynchronous to said carrier frequency and said selected pseudo-noise code, said fourth and fifth pseudo-noise codes respectively being time inverses of said first and second pseudo-noise codes, and including control means cooperable with said means which reproduces said information signal for causing said second pseudo-noise code generator means of said receiver to respectively select said fourth and fifth pseudo-noise codes to be said third pseudo-noise code when said information signal reproduced in said receiver is respectively in said two states thereof.

* * * * *